United States Patent [19]

Beiser

[11] Patent Number: 4,981,260
[45] Date of Patent: Jan. 1, 1991

[54] FAILSAFE THERMOSTAT FOR WATER-COOLED ENGINES

[75] Inventor: Philip Beiser, Brooklyn, N.Y.

[73] Assignee: Automotive Products Company, Whitestone, N.Y.

[21] Appl. No.: 425,066

[22] Filed: Oct. 23, 1989

[51] Int. Cl.⁵ ................................................ F01P 7/02
[52] U.S. Cl. ............................ 236/34.5; 236/DIG. 2; 137/74
[58] Field of Search ............... 123/41.08, 41.09, 41.10; 236/34, 34.5, DIG. 2, DIG. 5; 137/73, 74

[56] References Cited

U.S. PATENT DOCUMENTS

| | | | |
|---|---|---|---|
| 3,045,918 | 7/1962 | Woods | 236/34 |
| 3,498,537 | 3/1970 | Wong | 236/34 |
| 3,558,046 | 1/1971 | Kelly | 236/34 |
| 3,776,457 | 12/1973 | Cardi | 236/34.5 |
| 3,948,440 | 4/1976 | Wagner et al. | 236/34.5 |
| 4,245,782 | 1/1981 | Brown | 236/DIG. 2 |
| 4,257,553 | 3/1981 | Sliger et al. | 236/34.5 |
| 4,353,500 | 10/1982 | Brown | 236/34.5 |
| 4,353,501 | 10/1982 | Brown | 236/34.5 |

Primary Examiner—Noah P. Kamen
Attorney, Agent, or Firm—Arthur L. Plevy

[57] ABSTRACT

A thermostat adapted for use in a cooling system of an engine designed to operate between minimum and maximum operating temperatures is partially constructed from a meltable material that has a controlled melting point at the maximum operating temperature of the engine. If the thermostat fails to allow coolant to flow from the engine to a radiator, thereby causing the temperature of the engine to rise beyond its maximum operating temperature, the meltable portions of the thermostat are melted by the coolant, resulting in a path for the coolant to flow from the engine and to the radiator.

8 Claims, 2 Drawing Sheets

FAILSAFE THERMOSTAT FOR WATER-COOLED ENGINES

BACKGROUND OF THE INVENTION

The present invention relates to thermostats and more particularly to thermostats used in cooling systems of internal combustion engines Thermostats are commonly used to enable liquid-cooled automotive and industrial engines to operate within their specified design temperatures. When an engine is started, the thermostat operates to trap water within the engine, thereby enabling the engine temperature to increase. Once the operating temperature has been reached, the thermostat operates to permit the coolant to flow to a radiator. The coolant transfers heat from the engine to the radiator, thereby cooling the engine and preventing it from exceeding a maximum allowable operating temperature. Thus, by regulating the flow of coolant from the engine block to the radiator, the thermostat compensates for variations in load and ambient temperature and thereby maintains the temperature of the engine within an allowable operating range. Among the known thermostats, two types of valves are commonly used. The first type of valve, such as the one disclosed in U.S. Pat. No. 2,777,638, issued to C. W. Wood on Jan. 15, 1957, has a rectilinear movement. The second type of valve, such as the one disclosed in U.S. Pat. No. 2,815,174, issued to V. E. Rimsha on Dec. 3, 1957, is a butterfly type which swings about a transverse axis. Both types of valves are designed to operate between a closed position in which water is trapped within the engine and an open position in which water is allowed to flow from the engine to the radiator. When either valve is in the closed position, it rests upon a seat member which limits motion in the closing direction. Once the engine reaches its operating temperature, a temperature-responsive material contained within a plunger expands and thereby moves the valve to its open position.

As with any mechanical device, valves are subject to failure. If a valve fails to open, the coolant is trapped inside the engine and cannot transfer heat to the radiator; therefore, the engine temperature rises beyond the maximum allowable operating temperature, resulting in heat damage which can range from cylinder head gasket failure, to a cracked cylinder head or engine block, to a seized engine. Thus, a defective thermostat can cause catastrophic engine damage.

The prior art is aware of a need to guard against thermostat malfunctions. For example, U.S. Pat. No. 2,769,597 issued to E. L. Mayo on Nov. 6, 1956 discloses a thermostat that guards against valve failure due to the loss of expansible material An expansion member containing the expansible material is connected to the valve by a diaphragm and linkage element. As the material is lost, the diaphragm and linkage element move the valve to the open position. Thus, even though the expansion member cannot move the valve, the valve is still partially open position, thereby allowing water to flow therethrough. While this device safeguards against a loss of expansible material, it does not guard against situations where the valve sticks to the seat.

Therefore, it is an object of the present invention to provide an improved thermostat having a means for bypassing the valve in the event the valve fails to open.

It is a further object of the present invention to partially construct the improved thermostat from a material that melts when the engine exceeds its maximum operating temperature, thereby providing a passage for the coolant to bypass the valve.

SUMMARY OF THE INVENTION

In accordance with the teachings of the present invention, an improved thermostat is provided as part of a cooling system for an engine designed to operate between a minimum operating temperature and a maximum allowable operating temperature. The cooling system includes a coolant for removing heat from the engine, a heat-exchanger for removing heat from the coolant, a first hose for providing a circulation path for the coolant from the heat-exchanger to the engine, at least one return hose for providing a circulation path for the coolant from the engine to the heat-exchanger means and the improved thermostat, which is located between the engine and the first hose. The improved thermostat includes a temperature-controlled valve for allowing the coolant to flow from the engine to the heat-exchanger whenever the operating temperature of the engine exceeds the minimum operating temperature, and a mounting flange for mounting the temperature-controlled valve means to the first hose. In the improvement, the thermostat is partially constructed from a meltable material having a controlled melting point at the maximum allowable operating temperature of the engine such that when the engine exceeds the maximum temperature, the meltable material melts to provide a passage for the coolant to bypass the temperature-controlled valve and flow to the heat-exchanger. Thus, in the event of malfunction, the thermostat is bypassed, and catastrophic engine failure is avoided.

In one embodiment of the present invention, the mounting flange is provided with perforations which are filled with the meltable material. Thus, when the engine exceeds its operating temperature, the coolant melts the meltable material and thereafter flows through the perforations, enroute to the heat exchanger.

In another embodiment of the present invention, the temperature-controlled valve includes a valve operative between an open and closed position, a plunger containing expansible material for moving the valve, a seat attached to the mounting flange and opposed to the valve, and a spring located between the seat and the valve for urging the valve from the open position to the closed position. The seat is constructed of the meltable material. Thus, if the plunger loses expansible material such that it cannot move the valve, and the engine thereby exceeds its maximum operating temperature, the coolant melts the seat. As a result, the urging force of the spring is removed from the valve, thereby allowing the plunger to freely move the valve to the open position, and thereby allowing coolant to flow to the heat exchanger.

DETAILED DESCRIPTION OF THE FIGURES

Although the present invention is suitable for use in any type of cooling system, it is especially suitable for use in the cooling system of an internal combustion engine. Accordingly, the present invention will be described in connection with such a system.

Figure 1:
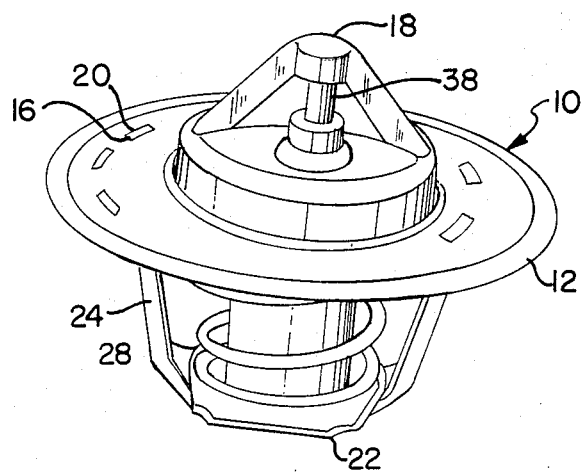
FIG. 1 is a perspective view of one embodiment of a thermostat constructed in accordance with the present invention.
Figure 2:
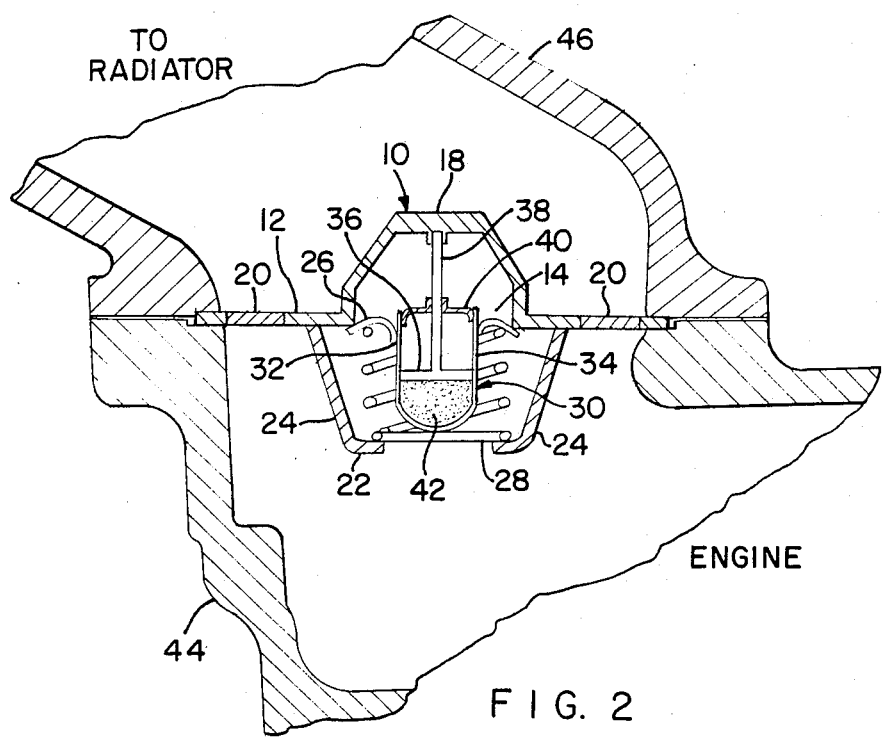
FIG. 2 is a cross-sectional view of the thermostat illustrated in FIG. 1 in a closed position.
Figure 3:
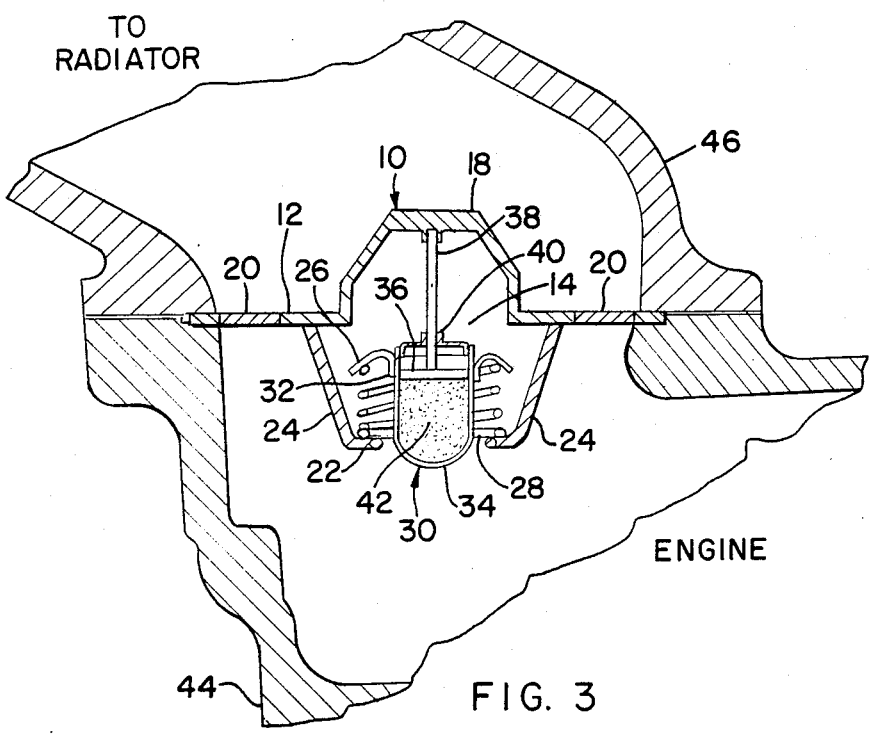
FIG. 3 is a cross-sectional view of the thermostat illustrated in FIG. 1 in an open position.

Referring now to FIGS. 1-3, there is shown a thermostat 10 constructed in accordance with the present invention. The thermostat 10 includes an annular mounting flange 12 having an upper surface and a lower surface. The mounting flange 12 is provided with a centrally-located aperture 14 which functions as a primary fluid port, and a plurality of perforations 16 located on the flange 12 about the central aperture 14 which function as an alternate fluid port as will become apparent hereinafter. While perforations 16 are employed in this particular embodiment, any number of geometric variations for the alternate passageway can be used. These can include circular, rectangular, arcuate and other shaped apertures. An arcuate member 18 is attached to the upper surface of the mounting flange 12 such that it extends over the central aperture 14. The central portion of the arcuate member 18 is crimped in a manner that will be described hereinafter. The mounting flange 12 and arcuate member 18 can be formed from a single sheet of metal such as stainless steel and so on by any well known process.

Each perforation 16 in the mounting flange 12 is filled with a meltable plug 20. The meltable plug 20 is made from a material that has a controlled melting point at the maximum operating temperature of the engine. The meltable plugs 20 can be made of a material such as a bismuth alloy. Alternately, the melting plug can be made of other materials, such as plastics or waxes, which are used in industrial products ranging from actuating links for sprinkler heads to various temperature measurement devices.

A seat 22 is located below the mounting flange 12 in a opposition to the central aperture 14. A pair of opposing arms 24 attach the seat 22 to the lower surface of the mounting flange 12. The seat 22 and arms 24 can be stamped from a single sheet of metal such as stainless steel. The function of the seat 22 will be described hereinafter.

An annular valve 26 dimensioned to cover the central aperture 14 abuts against the lower surface of the mounting flange 12. A helical spring 28 positioned between the valve 26 and the seat 22 urges the valve 26 against the mounting flange 12. The valve 26 surrounds a plunger 30 and is attached thereto by an annular flange 32. The plunger 30 includes a hollow cylinder 34 having one end closed and the opposite end open. The cylinder 34 is made of a thermally conductive material. The plunger 30 also includes a piston 36, which is dimensioned to slide within the cylinder 34, and an elongated stem 38 which extends longitudinally through the cylinder 34 and has one end rigidly connected to the piston 36. A cylinder plug 40 provided with a central orifice (not shown) is press fit into the open end of the cylinder 34 such that the elongated stem 38 extends through the central orifice. The free end of the stem 38 is fixedly attached to the arcuate member 18 which is crimped thereabout. Thus, the crimp functions to attach the elongated stem 38 to the arcuate member 18.

An expansible material 42 is located between the piston 36 and the closed end of the cylinder 34. Expansible materials 42, such as a mixture of wax and copper, are well known to those skilled in the art. When heated, the expansible material 42 expands and causes the piston 36 to slide relative to the cylinder 34. Because the elongated stem 38, which presses against the arcuate member 18, prevents the piston 36 from moving with respect to the mounting flange 12, the cylinder 34 is forced downward which, in turn, moves the valve 26 downward, thereby uncovering the central aperture 14. Thus, the cylinder 34 moves the valve 26 from a closed position in which the central aperture 14 is covered to an open position in which the central aperture 14 is uncovered. As the valve 26 is moved downwards to the open position, it compresses the spring 28. The compressed spring 28 functions to urge the valve 26 back to the closed position when the expansible material 42 cools.

Referring to FIGS. 2 and 3, the thermostat 10 is shown mounted to an engine 44. The engine 44 has a cooling system including a radiator hose 46, coolant and radiator. Since automotive cooling systems are well known to those skilled in the art, a detailed description is deemed unnecessary. Furthermore, the radiator and coolant are not shown. The radiator hose 46 provides a circulation path for coolant to flow from the engine 44 to the radiator. The mounting flange 12 is clamped between the engine 44 and the radiator hose 46; its lower surface faces the engine 44 and blocks the flow of coolant flowing from the engine. With the plunger 30 being submersed in the coolant, the coolant transfers heat from the engine 44 to the plunger 30.

Referring with particularity to FIG. 2, the thermostat 10 is shown in its closed position. Until the engine 44 warms up to its operating temperature, the temperature of the coolant is too low to cause the expansible mixture 42 to expand in the cylinder 34. Therefore, the helical spring 28 abuts the valve 26 against the mounting flange 12. Since the meltable plugs 20 block the flow of the coolant through the perforations 16 in the mounting flange 12, the coolant cannot flow from the engine 44. With the coolant trapped within the engine 44, the engine 44 quickly attains its operating temperature.

Referring now with particularity to FIG. 3, the thermostat 10 is shown in its open position. As the engine 44 attains its operating temperature, heat is provided to the coolant which, in turn, provides heat to the plunger 30. The heat provided to the plunger 30 causes the expansible mixture 42 in the cylinder 34 to expand, thereby forcing the cylinder 34 downward. The valve 26, moving conjointly with the cylinder 34, uncovers the central aperture 14, thereby allowing the coolant to flow from the engine 44, through the central aperture 14 and to the radiator. As the temperature of the coolant is subsequently reduced by the radiator, the expansible material 42 contracts, thereby allowing the spring 28 to urge the valve 26 towards the mounting flange 12. After the valve 26 closed, the temperature of the coolant once again rises causing the valve 26 to be moved to the open position. Thus, the cyclic movement of the valve 26 maintains the temperature of the engine 44 within a specified operating range.

When the thermostat 10 malfunctions, the meltable plugs 20 provide a failsafe mechanism. If, for example, the valve 26 sticks to the mounting flange 12, such that the coolant is trapped within the engine 44, the engine temperature continually rises until it exceeds the maximum operating temperature, whereupon the hot coolant melts the meltable plugs 20, thereby exposing the perforations 16. With the perforations 16 exposed, the coolant freely flows from the engine 44 to the radiator, bypassing the valve 26. Thus, catastrophic engine damage is avoided.

Figure 4:
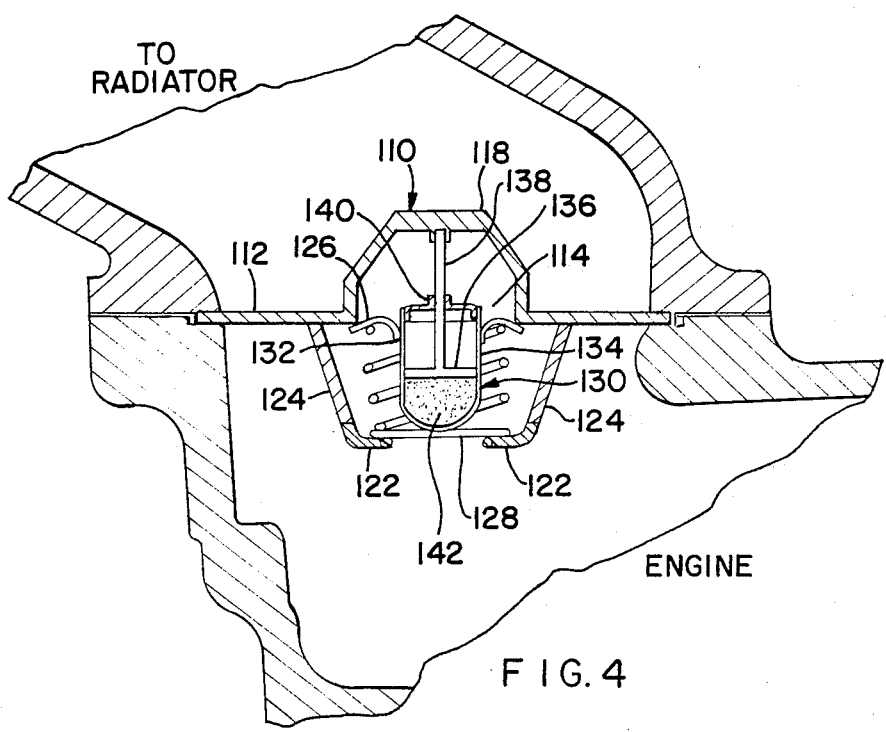
FIG. 4 is a cross-sectional view of another embodiment of the thermostat constructed in accordance with the present invention.

Referring now to FIG. 4, there is shown an alternate embodiment of a thermostat 110 mounted to the engine 144. The thermostat 110 is substantially the same as the thermostat 10 shown in FIG. 1, except that the mounting flange 112 is not perforated. Instead, the seat 122 is made from a meltable material that has a controlled melting point at the maximum operating temperature of the engine. If the cylinder 134 cannot exert a force on the spring 128 adequate to move the valve 126 to its open position, the engine 144 eventually exceeds its maximum operating temperature, whereupon the heat from the coolant melts the seat 122, thus releasing the spring force. As a result, the force urging the valve 126 against the mounting flange 112 is removed, whereby the plunger 130 is allowed to freely move the valve 126 to the open position, and thereby allow coolant to flow to the radiator. In this manner, circulation is reestablished.

Although the present invention has been described in connection with two highly specific exemplary embodiments thereof, it will be understood that many variations and modifications can be made by those of ordinary skill in the art. Therefore, it is manifestly intended that this invention be only limited by the claims and the equivalents thereof.

I claim:

1. In a cooling system of an engine designed to operate between a minimum operating temperature and a maximum operating temperature, the cooling system having a coolant for removing heat from the engine, a heat-exchanger means for removing heat from the coolant, a first circulation means for circulating the coolant from the engine to the heat-exchanger means, at least one return circulation means for circulating the coolant from the heat-exchanger means to the engine, and a thermostat means including temperature-controlled valve means operative between an open position in which the coolant is allowed to flow from the engine to the heat-exchanger means and a closed position in which the coolant is not allowed to flow from the engine to said heat-exchanger means, said open position occurring whenever the operating temperature of the engine exceeds the minimum operating temperature, and mounting means for mounting the temperature-controlled valve means to the engine;

the improvement wherein said mounting means includes a mounting flange disposed between the engine and the first circulation means and provided with a centrally-located aperture, and wherein said temperature-controlled valve means includes:
a temperature-responsive valve extending through said aperture in said mounting flange and functioning to allow the coolant to flow through said mounting flange whenever the engine exceeds its minimum operating temperature;
expansible moving means for moving said valve from said closed position to said open position in response to the engine exceeding its minimum operating temperature;
a seat attached to said mounting flange and opposed in spaced relation to said valve, said seat being constructed of a meltable material having a controlled melting point at the maximum operating temperature of the engine; and
a spring located in contact between said valve and said seat and being compressed whenever said expansion means moves said valve from said closed position to said open position and thereby functioning to urge said valve from said open position to said closed position, whereby if said expansible moving means cannot supply a force sufficient to compress said spring and said engine subsequently exceeds its maximum operating temperature, said meltable seat melts and releases said spring, thereby removing said urging force against said valve and allowing said expansible moving means to freely move said valve to said open position, whereby the coolant is allowed to flow from the engine to the heat-exchanger means, 2. An apparatus according to claim 1, wherein said meltable material is a metal.

3. An apparatus according to claim 1, wherein said meltable material is wax.

4. An apparatus according to claim 1, wherein said meltable material is plastic.

5. In a temperature-control apparatus adapted for use in a cooling system of an engine designed to operate between a minimum operating temperature and a maximum operating temperature, said apparatus including temperature-controlled valve means for allowing a coolant to flow out of the engine whenever the engine exceeds its minimum operating temperature, the coolant functioning to remove heat from the engine, and mounting means for mounting the temperature-controlled valve means to the engine, the improvement wherein said mounting means includes a mounting flange provided with a centrally-located aperture, and wherein said temperature-controlled valve means includes:
a temperature-responsive valve extending through said aperture in said mounting flange and functioning to allow the coolant to flow through said mounting flange whenever the engine exceeds its minimum operating temperature;
expansible moving means for moving said valve from a closed position to an open position in response to the engine exceeding its minimum operating temperature;
a seat attached to said mounting flange and opposed in spaced relation to said valve, said seat being constructed of a meltable material having a controlled melting point at the maximum operating temperature of the engine; and
a spring located in contact between said valve and said seat and being compressed whenever said expansible means moves said valve from said closed position to said open position and thereby functioning to urge said valve from said open position to said closed position, whereby if said expansible moving means cannot supply a force sufficient to compress said spring and said engine subsequently exceeds its maximum operating temperature, said meltable seat melts and releases said spring, thereby causing the removal of the force urging said valve to said closed position and allowing said expansible moving means to freely move said valve to said open position.

6. An apparatus according to claim 5, wherein said meltable material is a metal.

7. An apparatus according to claim 5, wherein said meltable material is wax.

8. An apparatus according to claim 5, wherein said meltable material is plastic.

* * * * *